L. A. HILL.
VEHICLE WHEEL.
APPLICATION FILED APR. 3, 1908.
924,614.
Patented June 8, 1909.
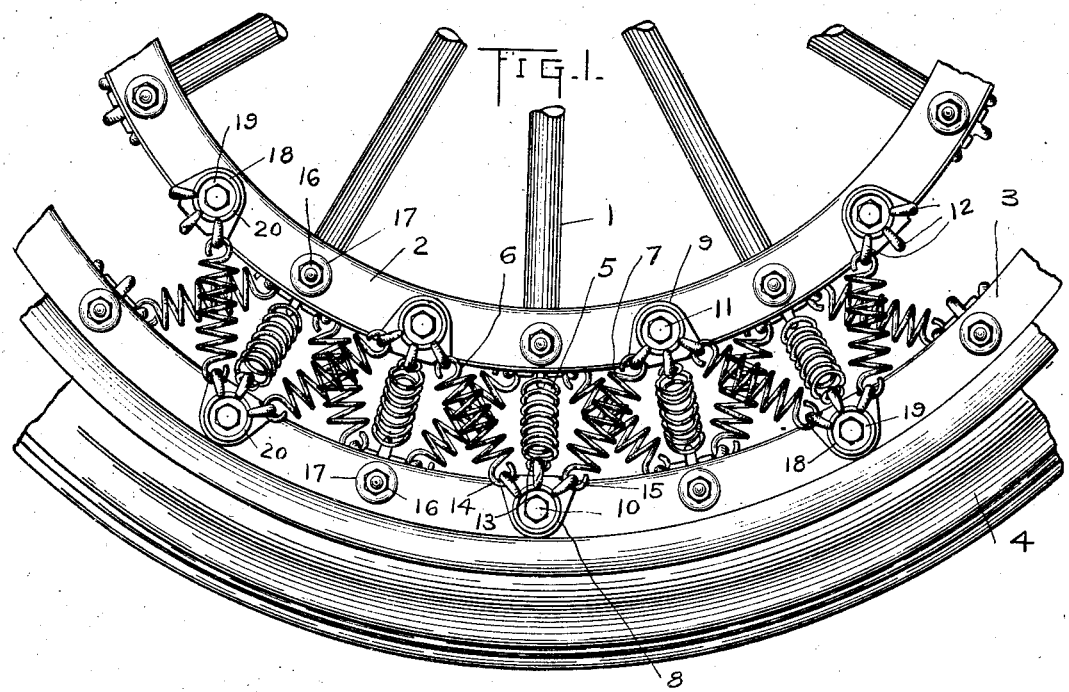
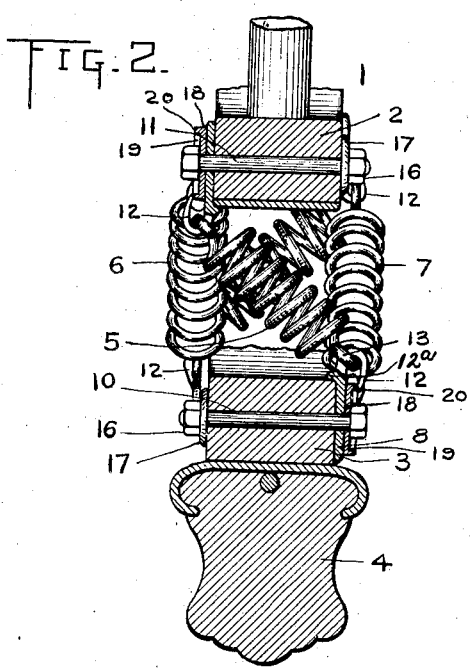
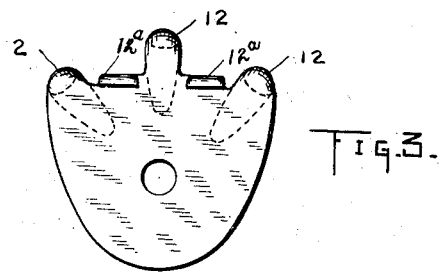
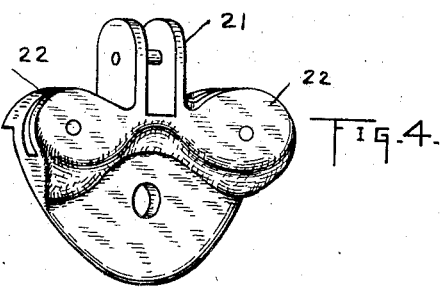
Witnesses
W. St. Evans.
Ernest F. Riley.
Inventor
Louis A. Hill

UNITED STATES PATENT OFFICE.

LOUIS A. HILL, OF WASHINGTON, DISTRICT OF COLUMBIA, ASSIGNOR TO AMERICAN RESILIENT WHEEL COMPANY, A CORPORATION OF DELAWARE.

VEHICLE-WHEEL.

No. 924,614.      Specification of Letters Patent.      Patented June 8, 1909.

Application filed April 3, 1908. Serial No. 424,918.

*To all whom it may concern:*

Be it known that I, LOUIS A. HILL, a citizen of the United States, residing at Washington, in the District of Columbia, have invented certain new and useful Improvements in Vehicle-Wheels, of which the following is a specification.

This invention relates to improvements in vehicle wheels.

The object of the present invention is to improve the construction of vehicle wheels, more especially that shown and described in reissued Letters Patent Number 12,647 granted to me the seventh day of May, 1907, and to lighten the construction and increase the strength, durability and quickness of recovery of the same.

The invention also has for its object to arrange the resilient braces or members of the cushioning means in the most advantageous positions for absorbing the varying strains of driving, braking and turning.

With these and other objects in view, the invention consists in the novel construction, arrangement and combination of parts hereinafter described and claimed.

In the accompanying drawings, Figure 1, is a side elevation of a portion of a wheel illustrating the preferred embodiment of the invention. Fig. 2, is a transverse sectional view. Fig. 3, is a detail view of the attaching plate, illustrating the arrangement of the lugs. Fig. 4, is a detail perspective view of an attaching plate, illustrating a modification of the invention.

Like numerals of reference designate corresponding parts in all of the figures of the drawings.

The vehicle wheel is equipped with an inner wheel member 1, of any preferred construction, provided with a rim 2, designated hereinafter as an inner rim and spaced from an outer rim 3, which carries a tire 4. The outer rim in practice is designed to be of the clencher type, and the tire preferably a solid elastic tire, but any desired construction of outer rim and tire may be employed, as their particular construction does not constitute any portion of the present invention. The inner wheel member is suspended within the outer rim by groups of resilient braces or members, consisting of coiled springs and located alternately at opposite sides of the wheel, the groups at one side of the wheel being arranged at the intervals between the groups at the other side of the wheel. The springs are stretched to place them under tension, and each group is composed of an intermediate member 5, and side members 6, and 7, set at an angle to one another and diverging from the outer rim and connected to the same and to the inner rim by outer and inner attaching plates 8, and 9. This aggroupment of the springs is specified for convenience of description, for the contiguous members of the adjacent groups diverging from the inner rim. The side members 6, and 7, are oppositely inclined, and are arranged to absorb respectively the driving torque and the brake stress, while the intermediate member 5, is inclined transversely of the wheel to absorb the side strains. The intermediate members 5, at opposite sides of the wheel are inclined in the opposite direction and extend across the wheel, each intermediate member being attached to one side of the outer rim and to the opposite side of the inner rim. The side members of the group form zig zag connections and have their inner and outer terminals attached to the inner and outer rims at the same side of the wheel. The oppositely inclined side members 6, and 7, and the transversely inclined intermediate member 5, of the groups at opposite sides of the wheel form four distinct sets or series of springs and constitute the cushioning means for yieldably suspending the inner wheel member 1, within the outer rim and to absorb the strains of driving, braking and turning.

The outer and inner attaching plates 8, and 9, which are secured to the outer and inner rims by bolts 10 and 11, are provided at their inner faces with spaced lugs $12^a$ to engage the rims 2, and 3, and they are equipped at their outer faces with intermediate and side hooks 12, which are linked into terminal loops 13, 14, and 15, of the intermediate and side members of the groups of springs. The attaching plates at opposite sides of each of the rims 2 and 3 are alternately arranged, the series at one side being located opposite the intervals between the plates at the opposite side. Also the inner and outer plates at the same side of the wheel are alternately arranged with respect to one another. The lugs prevent the attaching plates from turning on the bolts 10 and 11, which are provided with nuts 16, and washers 17 and 18. The washers 17 are interposed between the nuts and the rims, and the washers 18, which are provided with recesses 19, to receive the heads of the bolts, are fitted against the attaching plates. The recesses 18 form annular flanges 20, located at the peripheries of the washers and arranged to close the mouths of the hooks to retain the loops of the springs in engagement with the same. The hooks are arranged in a curved series concentric with the washer and the bills of the hooks extend over the edge of the annular flange 20. Instead of employing hooks for engaging the terminal loops of the springs the attaching plates may be equipped with spaced, intermediate, and side ears 21 and 22 as shown in Fig. 4, of the drawings. The ears 21 and 22 are arranged in pairs and the loops of the springs are secured between the ears by rivets or pins. The inner ears of the side pairs are formed by portions of the attaching plate.

While I have shown only coiled springs, by the term resilient braces or members it may be understood that any form of resilient brace or member may be used for connecting the inner and outer rims.

Having thus fully described my invention, what I claim as new and desire to secure by Letters Patent, is:

1. A vehicle wheel including spaced inner and outer rims, and annular series of groups of resilient braces or members located alternately at opposite sides of the wheel and connecting the rims, the braces or members of each group diverging inwardly from the outer rim and one of the members or braces of each group being extended across the wheel to the opposite side thereof.

2. A vehicle wheel including spaced inner and outer rims, annular series of resilient side braces or members arranged at an angle to one another and located alternately at opposite sides of the wheel and attached to the rims at the sides thereof to form zig zag side connections, and transversely disposed resilient braces or members extending across the wheel from the inner ends of one pair of side braces or members to the outer ends of the opposite pair.

3. A vehicle wheel including spaced inner and outer rims, inner and outer attaching plates located at the sides of the rims and provided with spaced lugs engaging the same, fastening devices piercing the plates and the rims, and resilient braces or members connecting the inner and outer plates.

4. A vehicle wheel including inner and outer rims, inner and outer attaching plates having hooks, resilient braces or members connecting the inner and outer plates and engaged by the hooks thereof, washers closing the mouths of the hooks and fastening devices piercing the washers and the plates.

5. A vehicle wheel including inner and outer rims, inner and outer attaching plates provided with hooks arranged in a curved series, resilient members connecting the inner and outer plates and engaged by the hooks, and means having curved flanges arranged in the mouths of the hooks for closing the same.

6. A vehicle wheel having spaced inner and outer rims, resilient connecting means for the rims arranged at each side of the wheel and extending entirely around the latter, said means being disposed in a zig-zag manner between the two rims, and the means on one side of the wheel being arranged the reverse of that on the other side, and resilient connecting means extending transversely of the wheel and connected at opposite ends to the respective rims, each transversely-extending means being disposed reversely to the adjacent one.

7. A vehicle wheel having spaced inner and outer rims, resilient connecting means for the rims arranged at each side of the wheel and extending entirely around the latter, said means at each side of the wheel comprising pairs of coiled springs arranged at an angle to each other and alternately connected to the inner and outer rims forming a zig-zag course about the wheel between the rims, the means on the respective sides being disposed reversely to each other, and coiled springs extending transversely of the wheel and connected at their opposite ends to the respective rims, each spring being disposed reversely to the one next thereto.

In testimony whereof I have affixed my signature in presence of two witnesses.

LOUIS A. HILL.

Witnesses:
FORD E. YOUNG,
ERNEST F. RILEY.